United States Patent [19]
Coulson

[11] 3,758,586
[45] Sept. 11, 1973

[54] CATALYTIC ADDITION OF SECONDARY ALIPHATIC AMINES TO ETHYLENE IN PRESENCE OF RHODIUM OR IRIDIUM SALTS

[75] Inventor: Dale Robert Coulson, Wilmington, Del.

[73] Assignee: E. I. du Pont de Nemours and Company, Wilmington, Del.

[22] Filed: Mar. 16, 1970

[21] Appl. No.: 20,146

[52] U.S. Cl......... 260/583 R, 260/247, 260/293.51, 260/326.8, 260/570.9, 260/577, 260/585 D
[51] Int. Cl............................................. C07c 85/00
[58] Field of Search..................... 260/583 R, 585 D, 260/293.51, 570.9, 577, 247, 326.8

[56] References Cited
UNITED STATES PATENTS

| | | | |
|---|---|---|---|
| 3,513,200 | 5/1970 | Biale | 260/583 B |
| 3,412,158 | 11/1968 | McClain | 260/585 D |
| 2,501,509 | 3/1950 | Gresham et al. | 260/585 D |
| 2,497,310 | 2/1950 | Larson | 260/585 D |

Primary Examiner—Lewis Gotts
Assistant Examiner—C. F. Warren
Attorney—Anthony P. Mentis

[57] ABSTRACT

Ethylene is reacted with a secondary aliphatic amine in the presence of rhodium or iridium catalysts to produce tertiary amines. The process is characterized in producing little or no by-products.

11 Claims, No Drawings

CATALYTIC ADDITION OF SECONDARY ALIPHATIC AMINES TO ETHYLENE IN PRESENCE OF RHODIUM OR IRIDIUM SALTS

BACKGROUND OF THE INVENTION

1. Field of the Invention

This invention is concerned with the preparation of tertiary amines by the addition of secondary amines to ethylene in the presence of selected rhodium or iridium catalysts.

2. Description of Prior Art

Known procedures for the catalyzed addition of secondary amines to ethylene have been limited to the use of heterogeneous catalysts. For example, Whitman U.S. Pat. No. 2,501,556 shows alkali metals or alkali metal hydrides as catalysts in the preparation of amines. In the reaction, ammonia or an ammonia-type compound such as primary, secondary or tertiary amine is reacted with an olefin such as ethylene or propylene. Whitman states the reaction is complex as is shown by the fact that if one starts with a secondary amine the reaction product contains secondary and tertiary amines. He further states that in every case there is obtained a greater or lesser amount of high boiling, high molecular weight amines, and usually also a mixture of high boiling, high molecular weight hydrocarbons. In McClain U.S. Pat. No. 3,412,158 the vapor phase addition of an olefin such as ethylene or propylene to ammonia to form primary amines is shown to be catalyzed by heterogeneous forms of noble metals, including rhodium and iridium, their oxides and their salts. No tertiary amines are produced.

DESCRIPTION OF THE INVENTION

There has now been discovered a process for reacting ethylene with secondary amines of the formula $HNRR^1$ in the presence of a rhodium or iridium catalyst whereby only N-ethyl tertiary amines of the formula $N(CH_2CH_3)RR^1$ are produced as the product. Unwanted by-products such as high molecular weight amines or high molecular weight hydrocarbons are not formed at all or in relatively small amounts so that expensive and time-consuming separation and purification steps are greatly reduced. It is a further unique feature of the invention that ethylene appears to be the only olefin operative in the process; propylene, for example, is not operative.

The rhodium or iridium catalyst is selected from the group consisting of a. $MX_3$, where M is Rh or Ir and X is Cl, Br, I, $NO_2$ or $NO_3$;

b. $MX_3 \cdot Y_3$, where M and X are defined as in (a) and Y is NaCl, KCl, $NH_4Cl$, $NaNO_2$, $KNO_2$, $NH_4NO_2$, $NH_3$, $H_2O$, pyridine, ethylenediamine, ethyleneimine, acetonitrile, $NR^2_3 \cdot HCl$ where $R^2$ is saturated alkyl of up to six carbon atoms, e.g., methyl, ethyl;

c. $IrX_4$, where X is defined as in (a).

d. $[A_2RhX^1]_2$, where A is CO, ethylene, propylene, butylene, 1/2(norbornadiene) or 1/2(cyclooctadiene) and $X^1$ or Cl or Br;

e.
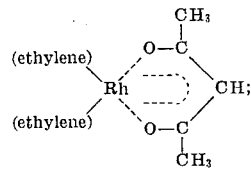

f. RhO;

g. $Rh_2O_3$.

In the above amines, R and $R^1$ may be aliphatic and phenyl-substituted aliphatic hydrocarbyl groups of up to 18 carbon atoms free of aliphatic carbon-to-carbon unsaturation, e.g., ethylenic, acetylenic or dienic, with the proviso that R and $R^1$, taken together, may be pentamethylene, tetramethylene, $-CH_2-CH_2-O-CH_2-CH_2-$, or loweralkyl- or phenyl-loweralkyl substituted pentamethylene. In the process of this invention the amine complexes and the several crystalline hydrates of the catalysts noted above may be employed as well as the anhydrous forms. The catalysts are operable in both heterogeneous and homogeneous forms.

In a preferred embodiment of this invention, the catalysts are used in homogeneous (e.g., dissolved) form. Solvents suitable for preparing the homogeneous catalysts must be chemically inert to the reactants, catalysts and products and must be capable of dissolving some substantial amount of the selected catalyst. It will be obvious that the degree of solubility will vary from catalyst to catalyst and from solvent to solvent. Operable solvents include saturated aliphatic hydrocarbons such as butane, pentane, hexane, cyclohexane, isooctane, octadecane, and the like; aromatic hydrocarbons such as benzene, toluene, xylene, ethylbenzene, cumene, and the like; ethers such as diethyl ether, dibutyl ether, 1,2-bis(ethoxy)ethane, 1,2-dimethoxyethane, dimethoxymethane, tetrahydrofuran, and the like; saturated aliphatic alcohols such as methanol, ethanol, isopropanol, isobutanol, hexanol, octadecanol, and the like; tertiary amines such as trimethylamine, triethylamine, tributylamine, dimethylethylamine, pyridine, N-ethylpiperidine, and the like; water; acetonitrile and hexamethylphosphoramide. An amount of solvent sufficient to dissolve an operable quantity of the catalyst is employed. An excess over this amount is usually employed. It is preferable but not essential that all of the catalyst be dissolved at any given time.

The process of the invention is specific for ethylene and is not operative when propylene is substituted for ethylene.

Temperatures in the range from 60° to 250° C. are useful for carrying out the process of this invention and temperatures in the range from 100° to 230° C. are preferred.

Pressures both above and below atmospheric pressure may be employed. Superatmospheric pressures as high as 2,000 atmospheres and over are useful but there is little advantage in using pressures above 5,000 lbs./sq.in. and accordingly pressures from atmospheric pressure up to 5,000 lbs./sq.in. are preferred. Pressures in the range from 200–1,000 lbs./sq.in. are particularly preferred.

The proportions of ethylene, secondary amine and catalyst are not limited and any amounts of these three components which are brought together under the conditions of the present process will yield the product N-ethyl tertiary amine. For most econonical operation it is preferred that the molar ratio of secondary amine to catalyst be in the range from 10:1 to 1,000:1. Since ethylene is usually less expensive than the starting secondary amine, it is preferred that the mole ratio of ethylene to secondary amine be 1:1 or greater.

The product tertiary amines may be recovered from the reaction mixture by distillation, chromatography or other means known in the art. These tertiary amines are known compounds which are useful as antioxidants for rubber, etc. and as intermediates in the preparation of quaternary ammonium surfactant compounds.

While it is not desired to be bound by speculation, it is believed the active catalyst species in the process of this invention may be the Rh(I) or Ir(I) complexes. These could be formed from complexes of Rh(III), Ir(III), and Ir(IV) by reduction in situ by the amines during the course of the reaction. For this reason, the various complexes of Rh(I), Rh(III), Ir(I), Ir(III) and Ir(IV) are all effective catalysts in the reaction.

A wide variety of ligands may be attached to the rhodium or iridium complexes in the above catalysts as long as they do not fall into either of the following classes, a. Divalent anions, e.g., $SO_4^=$,
b. Ligands of low volatility possessing $\pi$-acceptor ability greater than that of organic nitriles, as for example $AsCl_3$, $SbCl_3$, $PCl_3$, $P(OR)_3$, $SbR_3$ where R is a hydrocarbyl radical, and the like (see "Advanced Inorganic Chemistry," Cotton and Wilkinson, Interscience, 1966, p. 746).

SPECIFIC EMBODIMENTS OF THE INVENTION

The examples which follow are non-limitative and illustrate the process of the invention carried out on a batch basis. The process may equally well be conducted on a continuous basis by employing known means for introducing the reactants, catalyst and solvent, if any, to the reaction zone and for withdrawing the products and recovered starting materials therefrom.

In the examples, parts are by weight unless otherwise indicated.

EXAMPLE 1

$[A_2RhX^1]_2$; $A_2$ = cyclooctadiene and $X^1$ = Cl

A solution of 40 parts of benzene and one part of di-$\mu$-chlorobis(1,5-cyclooctadiene)dirhodium(I), otherwise known as [(cyclooctadiene)RhCl]$_2$, was charged to a stainless steel-lined pressure reactor. To this system was added 11.5 parts of dimethylamine and 137 atmospheres of ethylene pressure. The system was then heated, with agitation, to 200° C. for 3 hours. At the end of this period, the reaction was allowed to cool, vented to the atmosphere, and the resulting mixture distilled. A fraction distilling at 65–75° C. was analyzed by infrared spectroscopy. Comparison of this spectrum with authentic dimethylethylamine in benzene showed the two solutions to be identical. Gas liquid chromatography of the reaction mixture showed a total yield of 2.5 parts of N,N-dimethylethylamine (13% yield based on dimethylamine).

EXAMPLE 2

$MX_3$; M = Rh, X = Cl

A mixture of 60 parts of methanol and one part of rhodium trichloride trihydrate was charged to a stainless steel-lined pressure reactor. To this system was added 38 parts of ethylene and 20 parts of dimethylamine. The mixture was then heated with agitation to 200° C. for 3 hours. A clear brown-yellow solution resulted. Analysis by nuclear magnetic resonance revealed 6.5 parts of N,N-dimethylethylamine (24% yield based on dimethylamine).

Similar results were obtained using as solvent acetonitrile, pyridine, tetrahydrofuran, 1,2-dimethoxyethane and hexamethylphosphoramide under the conditions described above.

EXAMPLE 3

$MX_3$; M = Rh, X = Cl

A mixture of 33 parts of piperidine, 67 parts of tetrahydrofuran and one part of rhodium trichloride trihydrate was placed in a stainless steel pressure reactor. To this was added 17 parts of ethylene. The mixture was heated to 200° C. for 3 hours and the resulting clear yellow-brown solution was analyzed by gas liquid chromatography. A single product was observed and gave a retention time of 4 minutes on a 4-foot, 20% Theed [N,N,N',N'-tetra($\beta$-hydroxyethyl)ethylenediamine] column at 100° C. After collection, this product was found, by infrared comparison, to be identical with N-ethylpiperidine. A total of 30 parts (70% yield based on piperidine) was found in the reaction solution.

Similar results were obtained using diethylamine, N-ethylbutylamine, pyrrolidine and morpholine under the reaction conditions described above. The products were triethylamine, N,N-diethylbutylamine, N-ethylpyrrolidine and N-ethylmorpholine, respectively.

EXAMPLE 4

$MX_3$; M = Rh, X = Br

A mixture of 40 parts of tetrahydrofuran and one part of rhodium tribromide trihydrate was placed in a stainless steel pressure reactor. To this was added eight parts of ethylene and 12 parts of dimethylamine. The mixture was heated to 170° C. for 3 hours with agitation. The resulting clear yellow solution was then analyzed for N,N-dimethylethylamine by nuclear magnetic resonance. It was found that 3 parts (15% yield based on dimethylamine) of product was present in the solution.

Other rhodium compounds such as rhodium triiodide trihydrate, di-$\mu$-chlorotetracarbonyldirhodium(I), [(CO)$_2$RhCl]$_2$, di-$\mu$-chlorotetraethylenedirhodium(I), [(CH$_2$=CH$_2$)$_2$RhCl]$_2$, acetylacetonatodiethylenerhodium(I), and rhodium trinitrate trihydrate gave similar results when substituted for rhodium tribromide, trihydrate in Example 4.

EXAMPLE 5

$MX_3$; M = Ir, X = Cl

A mixture of one part of iridium trichloride trihydrate and 42 parts of tetrahydrofuran was placed in a stainless steel pressure reactor. To this was added 8.5 parts of ethylene and 14 parts of dimethylamine. The mixture was then heated, with agitation, to 200° C. for 3 hours. The resulting yellow-brown solution was analyzed by nuclear magnetic resonance and found to contain 1.2 parts of N,N-dimethylethylamine (6% yield based on the dimethylamine charged).

EXAMPLE 6

$MX_3$; M = Rh, X = Cl

A mixture of 39 parts of piperidine, 44 parts of tetrahydrofuran and one part of rhodium trichloride trihydrate was placed in a stainless steel pressure reactor. The system was then charged with 18 parts of ethylene. The mixture was heated to 180° C. for 3 hours with agitation. The resulting liquid phase was distilled at atmospheric pressure giving 28 parts (65% yield based on piperidine charged) of N-ethylpiperidine, b.p. 127° to 130° C.

EXAMPLE 7

$MX_3$; $M = Rh$, $X = Cl$

In an 80-ml. stainless steel reactor a series of preparations of N-ethylpiperidine were carried out as shown in Table I. As indicated in each item, the respective amounts of piperidine, ethylene, $RhCl_3 \cdot 3H_2O$ catalyst and hexamethylphosphoramide solvent were charged into the reactor which was then closed and heated at the indicated temperature under autogenous pressure with agitation for 3 hours. The bomb was then cooled and opened and the N-ethylpiperidine product recovered from the reaction mixture by distillation.

TABLE I

| Item | Piperidine mmoles | Ethylene mmoles | $RhCl_3 \cdot 3H_2O$ mmoles | Hexamethyl-phosphor-amide, ml. | Temp., °C. | N-Ethyl piperidine mmoles |
|---|---|---|---|---|---|---|
| a | 20 | 100 | 1.0 | 28 | 130 | 8.7 |
| b | 40 | 100 | 1.0 | 26 | 130 | 9.6 |
| c | 50 | 100 | 1.0 | 24 | 130 | 9.1 |
| d | 50 | 100 | 1.0 | 24 | 130 | 7.3 |
| e | 50 | 100 | 1.0 | 24 | 130 | 6.3 |
| f | 60 | 100 | 1.0 | 24 | 130 | 10.8 |
| g | 60 | 100 | 1.0 | 24 | 130 | 11.1 |
| h | 60 | 100 | 1.0 | 22 | 130 | 10.1 |
| i | 80 | 100 | 1.0 | 20 | 130 | 8.4 |
| j | 100 | 100 | 1.0 | 24 | 130 | 2.1 |
| k | 60 | 100 | 0.2 | 24 | 130 | 3.8 |
| l | 60 | 100 | 0.4 | 24 | 130 | 10.4 |
| m | 60 | 100 | 0.8 | 24 | 130 | 9.1 |
| n | 60 | 100 | 0.8 | 24 | 130 | 10.8 |
| o | 60 | 100 | 1.0 | 24 | 130 | 13.9 |
| p | 60 | 100 | 1.5 | 24 | 130 | 14.6 |
| q | 60 | 100 | 2.0 | 24 | 130 | 25.0 |
| r | 60 | 100 | 1.0 | 24 | 110 | 3.1 |
| s | 60 | 200 | 1.0 | 24 | 110 | 3.7 |
| t | 60 | 300 | 1.0 | 24 | 110 | 2.9 |
| u | 60 | 300 | 1.0 | 24 | 110 | 6.1 |
| v | 60 | 300 | 1.0 | 24 | 110 | 2.6 |
| w | 60 | 400 | 1.0 | 24 | 110 | 4.4 |
| x | 60 | 400 | 1.0 | 24 | 110 | 7.0 |
| y | 60 | 500 | 1.0 | 24 | 110 | 5.8 |
| z | 60 | 700 | 1.0 | 24 | 110 | 4.9 |
| aa | 60 | 900 | 1.0 | 24 | 110 | 5.8 |

EXAMPLE 8

$MX_3$; $M = Rh$, $X = Cl$

A mixture of 200 parts of water and 2.63 parts of rhodium trichloride trihydrate was charged to a stainless steel-lined pressure reactor. To this system was added 30 parts of ethylene and 50 parts of dimethylamine. The mixture was then heated with agitation at 170° C. for 3 hours. A clear solution resulted. Analysis by nuclear magnetic resonance indicated a yield of seven parts of N,N-dimethylethylamine.

When the secondary amines shown in the first column of Table II are substituted for dimethylamine, piperidine, diethylamine, N-ethylbutylamine, pyrrolidine and morpholine in the procedures of Examples 1–8 above, the N-ethyl tertiary amine products indicated in the second column are obtained.

TABLE II

| Secondary Amine Starting Materials | Tertiary Amine Products |
|---|---|
| N-Methylbenzylamine | N-Ethyl-N-methylbenzylamine |
| N-Butylbenzylamine | N-Butyl-N-ethylbenzylamine |
| Dibenzylamine | N-Ethyldibenzylamine |
| Dibutylamine | N-Ethyldibutylamine |
| Dihexylamine | N-Ethyldihexylamine |
| Dinonylamine | N-Ethyldinonylamine |
| Dioctadecylamine | N-Ethyldioctadecylamine |
| N-Ethylbutylamine | N,N-Diethylbutylamine |
| 4-Benzylpiperidine | N-Ethyl-4-benzylpiperidine |
| 4-(3-Phenylpropyl)-piperidine | N-Ethyl-4-(3-phenylpropyl)-piperidine |
| 3-Azabicyclo[3.2.2]nonane | N-Ethyl-3-azabicyclo[3.2.2]-nonane |
| 3-Methylpiperidine | N-Ethyl-3-methylpiperidine |
| 4-Methylpiperidine | N-Ethyl-4-methylpiperidine |
| N-Methyldodecylamine | N-Ethyl-N-methyldodecylamine |

The following catalysts (Table III) are also operable in the process of this invention as illustrated in the preceding examples.

TABLE III

| Catalyst | Formula |
|---|---|
| Rhodium trichloride | $RhCl_3$ |
| Rhodium trichloride trihydrate | $RhCl_3 \cdot 3H_2O$ |
| Rhodium tribromide dihydrate | $RhBr_3 \cdot 2H_2O$ |
| Rhodium triiodide | $RhI_3$ |
| Rhodium trinitrate trihydrate | $Rh(NO_3)_3 \cdot 3H_2O$ |
| Iridium trichloride | $IrCl_3$ |
| Iridium tetrachloride | $IrCl_4$ |
| Iridium tribromide tetrahydrate | $IrBr_3 \cdot 4H_2O$ |
| Iridium tetrabromide | $IrBr_4$ |
| Iridium tetraiodide | $IrI_4$ |
| Iridic sodium chloride | $IrCl_4 \cdot 2NaCl$ |
| Iridic potassium chloride | $IrCl_4 \cdot 2KCl$ |
| Iridic potassium nitrite | $Ir(NO_2)_3 \cdot 3KNO_2$ |
| Iridic ammonium chloride | $IrCl_4 \cdot 2NH_4Cl$ |
| Iridous sodium chloride | $IrCl_3 \cdot 3NaCl \cdot 12H_2O$ |
| Iridous potassium chloride | $IrCl_3 \cdot 3KCl \cdot 3H_2O$ |
| Iridic ammonium nitrite | $Ir(NO_2)_3 \cdot 3NH_4NO_2$ |
| Ammonium sodium rhodium nitrite | $Rh(NO_2)_3 \cdot 2NH_4NO_2 \cdot NaNO_2$ |
| Potassium rhodium nitrite | $Rh(NO_2)_3 \cdot 3KNO_2$ |
| Sodium rhodium chloride | $RhCl_3 \cdot 3NaCl \cdot 18H_2O$ |
| Potassium rhodium chloride | $RhCl_3 \cdot 2KCl$ |
| Ammonium rhodium chloride | $RhCl_3 \cdot 3NH_4Cl \cdot 3H_2O$ |
| Di-μ-chlorotetracarbonyldi-rhodium(I) | $[(CO)_2RhCl]_2$ |
| Di-μ-chlorotetraethylenedi-rhodium(I) | $[(CH_2{=}CH_2)_2RhCl]_2$ |
| Di-μ-chlorobis(1,5-cyclooctadiene)dirhodium(I) | $[(Cyclooctadiene)RhCl]_2$ |
| Acetylacetonatodiethylene-rhodium(I) | |

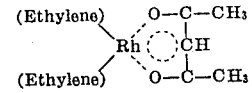

I claim:

1. A process for the production of aliphatic tertiary amines which consists essentially in reacting ethylene with
   a secondary amine of the formula $HNRR^1$
   wherein R and $R^1$ are selected from the group consisting of aliphatic and phenyl-substituted aliphatic hydrocarbyl groups having up to 18 carbon atoms and being free of aliphatic carbon-to-carbon unsaturation, with the proviso that R and R¹ taken together may be pentamethylene, tetramethylene, -CH₂-CH₂-O-CH₂-CH₂-, or lower alkyl-or phenyl-lower alkyl substituted pentamethylene, in the presence of a catalytically effective amount of a dissolved catalyst carried out at a temperature in the range from 60° to 250° C, at a pressure in the range from atmospheric to 5,000 lbs./sq.in., and at a molar ratio of secondary amine to catalyst in the range from 10:1 to 1,000:1, said catalyst being selected from the group consisting of a. MX₃, where M is Rh or Ir and X is Cl, Br, I, NO₂ or NO₃;
b. MX₃.Y₃, where M and X are defined as in (a) and Y is NaCl, KCl, NH₄Cl, NaNO₂, KNO₂, NH₄NO₂, NH₃, H₂O, pyridine, ethylenediamine, ethyleneimine, acetonitrile, NR²₃ HCl where R² is saturated alkyl of up to six carbon atoms;
c. IrX₄, where X is defined as in (a);
d. [A₂RhX¹]₂, where A is CO, ethylene, propylene, butylene, 1/2(norbornadiene) or 1/2(cyclooctadiene) and X¹ is Cl or Br;
e.

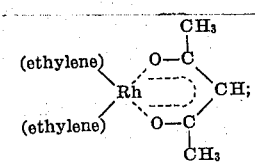

f. RhO;
g. Rh₂O₃, and recovering a tertiary amine of the formula N(CH₂CH₃)RR¹ wherein R and R¹ are as defined above.

2. The process of claim 1 in which the catalyst is dissolved in tetrahydrofuran.

3. The process of claim 1 carried out in the range of 100°C. to 230° C.

4. The process of claim 1 carried out in the range of 200 to 1,000 lbs./sq.in.

5. The process of claim 1 wherein the molar ratio of ethylene to secondary amine is 1:1 or greater.

6. The process of claim 1 wherein the catalyst is di-μ-chlorobis(1,5-cyclooctadiene)dirhodium(I).

7. The process of claim 1 in which the catalyst is RhCl₃.

8. The process of claim 1 in which the catalyst is IrCl₃.

9. A process according to claim 1 wherein the catalyst is selected from the group consisting of
di-μ-chlorobis(1,5-cyclooctadiene)dirhodium(I),
rhodium trichloride trihydrate,
rhodium tribromide trihydrate, and
iridium trichloride trihydrate.

10. A process according to claim 1 for the production of N,N-dimethylethylamine consisting essentially of reacting ethylene with dimethylamine in the presence of a catalyst selected from di-μ-chlorobis(1,5-cyclooctadiene)-dirhodium(I), rhodium trichloride trihydrate, rhodium tribromide trihydrate and iridium trichloride trihydrate.

11. A process according to claim 10 wherein the catalyst is di-μ-chlorobis(1,5-cyclooctadiene)dirhodium(I).

* * * * *